(No Model.) 2 Sheets—Sheet 2.
G. W. PARSONS.
BAND CUTTER AND FEEDER FOR THRASHING MACHINES.
No. 493,367. Patented Mar. 14, 1893.
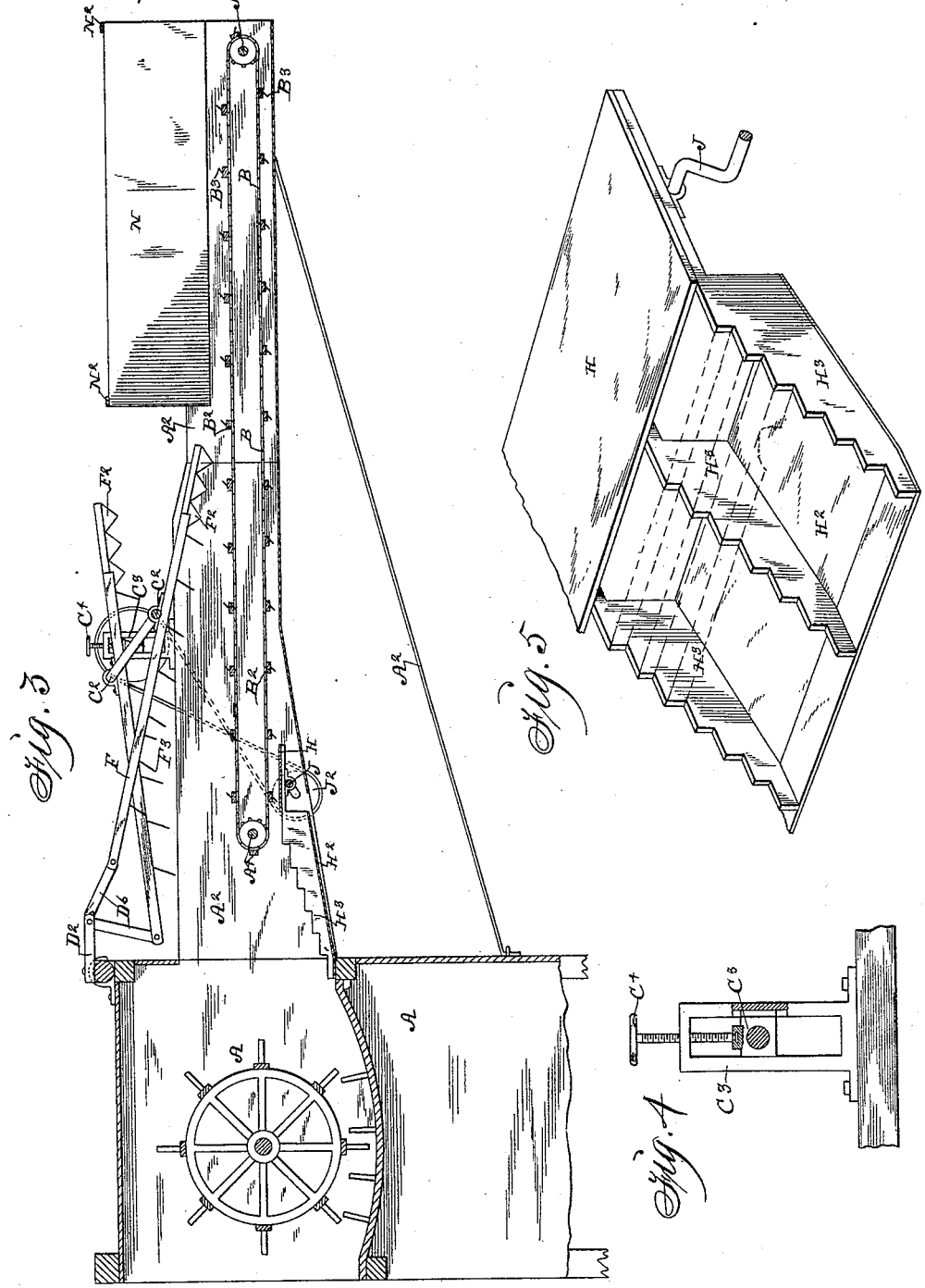

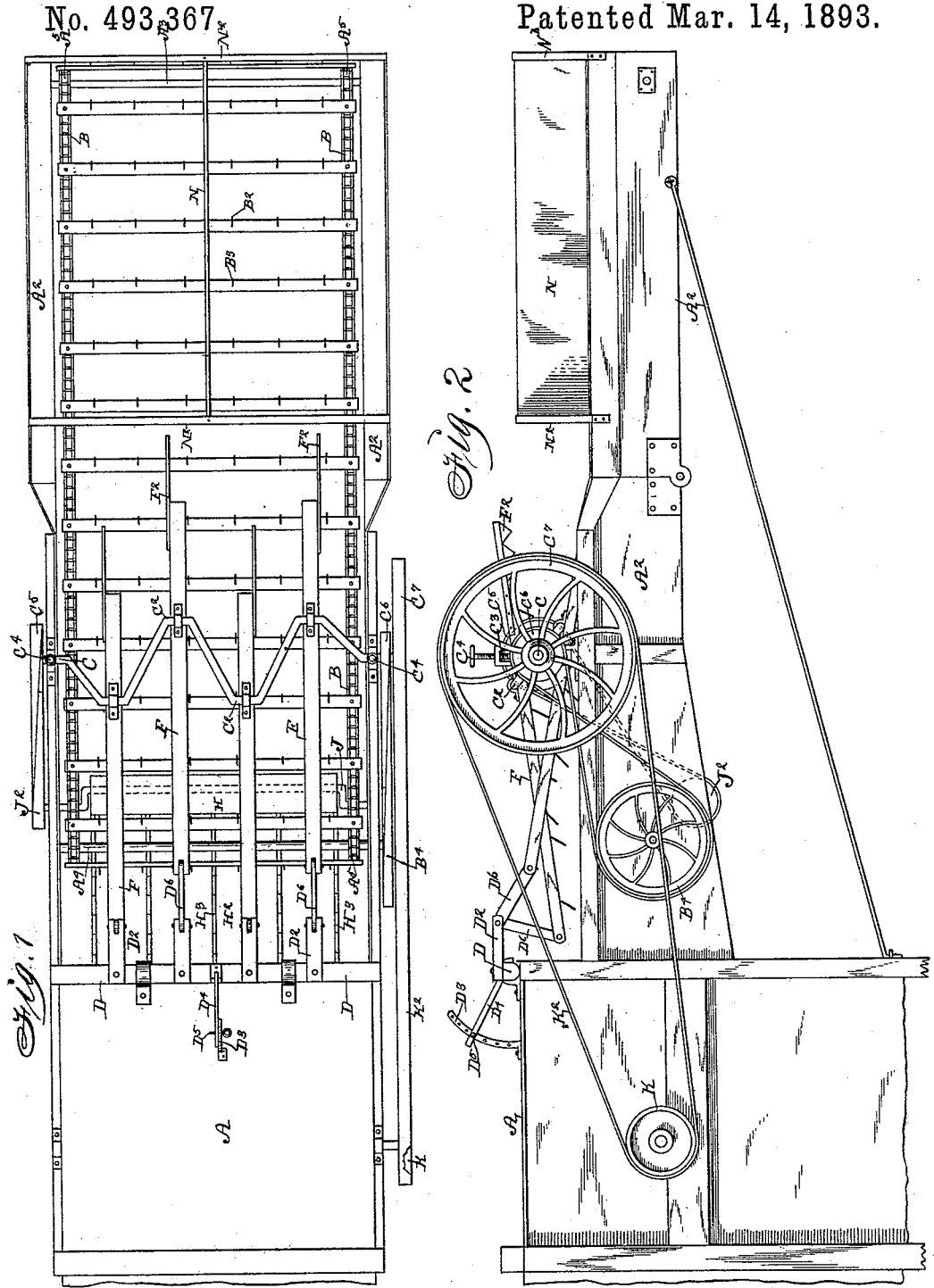

UNITED STATES PATENT OFFICE.

GEORGE W. PARSONS, OF NEWTON, IOWA, ASSIGNOR OF ONE-HALF TO W. C. BERGMAN, OF SAME PLACE.

BAND-CUTTER AND FEEDER FOR THRASHING-MACHINES.

SPECIFICATION forming part of Letters Patent No. 493,367, dated March 14, 1893.

Application filed September 23, 1892. Serial No. 446,674. (No model.)

*To all whom it may concern:*

Be it known that I, GEORGE W. PARSONS, a citizen of the United States of America, residing at Newton, in the county of Jasper and State of Iowa, have invented a new and useful Band-Cutter and Feeder for Thrashing-Machines, of which the following is a specification.

The object of my invention is primarily to provide improved and simplified mechanism which will automatically advance bundles or sheaves of grain into a thrashing machine cut the bands for the same and distribute the grain in a regular and uniform manner into the thrashing machine.

My invention consists further in the construction, arrangement and combination of the mechanism for cutting the bundles of grain apart and distributing the stalks evenly over the carrier, and the means for adjusting the said cutting and distributing mechanism whereby they may be adapted to suit various sized bundles.

My invention consists further in the construction, arrangement and combination of various other parts of the device as hereinafter more specifically set forth, pointed out in my claims and illustrated in the accompanying drawings.

Figures 1 and 2 are respectively top and side views of my invention applied to a portion of a thrashing machine as in practical use. Fig. 3 is a vertical longitudinal sectional view of the same. Fig. 4 is an enlarged detail sectional view of the mechanism for raising and lowering the crank shaft. Fig. 5 is an enlarged detail perspective view of part of the mechanism for straightening grain and advancing it into the thrashing machine.

Referring to the accompanying drawings the reference letter A is used to designate the portion shown of the thrashing machine which same is of ordinary construction.

$A^2$ is a frame attached to the end portion of a thrashing machine in juxtaposition to the thrashing cylinder of the machine. Mounted in the opposite ends of the aforesaid frame are the rotatable shafts $A^3$ and $A^4$ and fixed to these shafts are the sprocket wheels $A^5$.

B B designate endless sprocket chains passing over said sprocket wheels and having the slats $B^2$ fixed thereto at regular intervals to support and carry grain toward the thrashing machine. $B^3$ designate teeth or tines fixed to said slats and projecting slightly rearwardly relative to the line of advance for purposes hereinafter to be set forth.

$B^4$ designates a belt wheel mounted on one end of the shaft $A^4$ on the outside of the frame $A^2$ to provide means whereby motion may be imparted to the endless carrier from other portions of the device.

C designates a shaft mounted in the frame $A^2$ above the endless carrier. It is provided with a plurality of oppositely disposed crank arms $C^2$ and its ends are mounted in the vertically adjustable bearing $C^3$ which are adapted to be operated by means of the band wheel $C^4$. Mounted on the outer ends of this shaft are the belt wheels $C^5$ and $C^7$ by which motion is transmitted to it and from thence to other parts of the machine.

D designates a rock shaft mounted in bearings which are preferably secured to the top of the thrashing machine. $D^2$ are arms fixed thereto and extended rearwardly in the direction of the frame $A^2$.

$D^3$ designates a segmental bar fixed to the top of the thrashing machine, and $D^4$ an arm fixed to the rock-shaft D and extended into proximity to the said bar, perforations are formed in the bar and a pin $D^5$ extended through the arm $D^4$ to enter the said perforations in the bar and thereby secure the rock shaft in any desirable position.

$D^6$ designate links pivotally connected with the outer ends of the arms $D^2$.

F designate bars pivotally connected with the lower ends of the aforesaid links and also connected with the crank formations $C^2$ on the shaft C. It will now be seen that upon a rotation of the shaft C the bars F will have imparted to them an approximately rotary-reciprocating motion in which the outer ends of the bars will first be lowered after the rearward limit of their stroke has been passed and then the bar will be brought forward in an approximately horizontal position. This stroke however may be altered and the distance relative to the endless carrier adjusted as hereinafter set forth by adjusting the rock shaft D on the vertical adjustable bearings $C^3$.

In the outer ends of the bars F are fixed the knife blades F². The function of these knives is to sever the bands of the grain when advanced under the knives by the endless carrier, and fixed to the bar at regular intervals throughout the remainder of the under surfaces are the tines F³ which incline downwardly and forwardly therefrom. These bars are also so arranged that their forward motion toward the thrashing machine is more rapid than that of the endless carrier and it will now readily be seen that the upper portion of a bundle of grain when placed between the said bar and endless carrier will be advanced into the thrashing machine more rapidly than the under portion of the same bundle, which is engaged by the tines on the endless carrier. By this arrangement a bundle of grain is evenly distributed over the surface of the carrier and thereby fed to the thrashing cylinder in an even regular manner.

To advance the grain from the carrier to the thrashing cylinder of the machine and at the same time arrange all of the stalks of grain longitudinally of the carrier I employ the following mechanism.

H designates a platform located directly beneath the forward portion of the endless carrier and H² is a like platform a slight distance beneath the aforesaid platform and which extends into proximity to the thrashing cylinder, these platforms H and H² are connected by means of the notched strips H³ which are extended longitudinally of the platforms and may be covered with sheet metal as indicated by dotted lines in Fig. 5.

J designates a crank shaft having its bearings in the sides of the frame A² and which is connected with the platform H to impart a rotary motion thereto. The lower end portion of the platform H² rests upon the frame A² so that the motion imparted to it from the crank J is converted into a partially reciprocating movement. A belt wheel J² on one end of this shaft J provides means whereby it may be operated from other parts of the machine.

K designates a belt wheel connected with certain operative parts of the thrashing machine. A belt K² connects the wheel with the wheel C⁷ and thereby transmits motion from the thrashing machine to the feed mechanism.

N, designates a partition supported by the braces N² above the center of the endless carrier, to admit bundles on either side thereof.

In practical operation, the bundles of grain are placed upon the endless carrier, which advances them to the cutting mechanism where the bundles are severed, the grain is then engaged by the tines and the bars and also the tines on the carrier which distributes it evenly over the surface of the carrier. The straightening and advancing mechanism then feed it to the thrashing cylinder.

The device may be readily and quickly adapted for bundles of grain of different sizes by a manipulation of the hand wheel C⁴ which operates the vertically adjustable bearings for the crank shaft and raises or lowers the bars F and the forward ends of these bars may be adjusted by a movement of the rock shaft D as set forth.

Having thus described the construction and function of the device, what I claim as my invention, and desire to secure by Letters Patent, is—

1. A band cutter and feeder for thrashing machines comprising a suitable supporting frame secured to a thrashing machine an endless carrier in said frame having cross bars with rearwardly inclined tines and a plurality of bars arranged above the said endless carrier and provided with knives on their outer ends and tines throughout the remainder of their length, inclined forwardly, so as to be in an opposite direction from the tines on the endless carrier, to distribute the grain evenly over the carrier and means for operating said bars and carrier.

2. A feeder for thrashing machines and the like comprising a supporting frame adapted to be attached to a thrashing machine, an endless carrier mounted in said frame to advance bundles or sheaves of grain toward the thrasher, tines in the said carrier projecting upwardly and rearwardly relative to the line of advance, a shaft having oppositely disposed cranks mounted above the said carrier a plurality of bars pivotally attached to the said cranks near their outer ends and having knives fixed to their outer ends and forwardly inclined tines located at regular intervals throughout the remainder of their length, a plurality of links pivotally attached to a suitable support and connected with the inner ends of the said bars, and means for automatically operating the said parts.

3. A feeder for thrashing machines and the like comprising a suitable supporting frame secured to a thrashing machine, the endless carrier having the rearwardly inclined tines mounted in said frame as set forth, the rotatable shaft having the oppositely disposed cranks mounted in the bearings as set forth, the said bearings the rock shaft mounted in bearings secured to the thrashing machine arms projecting rearwardly therefrom and links depending from said arms, means for adjusting the said rock shaft as set forth, a plurality of bars having the knives on their outer ends and the forwardly inclined tines on their inner ends as set forth and connected with the aforesaid cranks and links as shown and means for automatically operating said mechanism from power derived from the thrasher.

4. A feeder for thrashing machines and the like, comprising a suitable supporting frame attached to a thrashing machine the endless carrier having the rearwardly inclined tines mounted in said frame as set forth, the rotatable shaft having the oppositely disposed cranks mounted in the vertical adjustable bearings as set forth the said cranks having a plurality of bars having knives on their outer ends and forwardly inclined tines on the remainder of their lengths, as set forth, means for pivotally connecting the said bars with the oppositely disposed cranks and means substantially as set forth for supporting the inner ends of the bars and for adjusting said supports, and the mechanism shown and described for advancing the grain from the endless carrier to the thrashing cylinder and for straightening the grain, all arranged and combined substantially in the manner set forth for the purposes stated.

GEORGE W. PARSONS.

Witnesses:
W. O. McELROY,
HENRY SILWOLD.